United States Patent [19]

Hurt

[11] 4,227,578
[45] Oct. 14, 1980

[54] ISOLATION FRAME
[75] Inventor: Henry W. Hurt, Lubbock, Tex.
[73] Assignee: Lubbock Manufacturing Company, Lubbock, Tex.
[21] Appl. No.: 695,083
[22] Filed: Jun. 11, 1976
[51] Int. Cl.³ .................. A01B 13/08; A01B 15/04; A01B 35/32; A01B 59/042
[52] U.S. Cl. ................................................. 172/40
[58] Field of Search ........................ 172/40, 449, 439

[56] References Cited
U.S. PATENT DOCUMENTS

| | | | |
|---|---|---|---|
| 2,716,855 | 9/1955 | Sorensen et al. | 172/449 |
| 3,396,804 | 8/1968 | Rogers | 172/40 |
| 3,448,813 | 6/1969 | Rogers | 172/40 |
| 3,627,056 | 12/1971 | Rogers | 172/40 |

FOREIGN PATENT DOCUMENTS

| | | | |
|---|---|---|---|
| 89465 | 2/1958 | Denmark | 172/449 |
| 1297372 | 6/1969 | Fed. Rep. of Germany | 172/40 |
| 6805733 | 10/1969 | Netherlands | 172/40 |
| 1008692 | 11/1965 | United Kingdom | 172/449 |

*Primary Examiner*—Paul E. Shapiro
*Attorney, Agent, or Firm*—Wendell Coffee

[57] ABSTRACT

An isolation frame is connected between a conventional three-point hitch of a tractor and a vibrating plow frame. The vibrating plow frame has a plurality of rippers thereon and is mounted to the isolation frame to vibrate in a horizontal direction normal to the direction of draft. The isolation frame itself can vibrate in a horizontal direction normal to the direction of draft.

4 Claims, 4 Drawing Figures

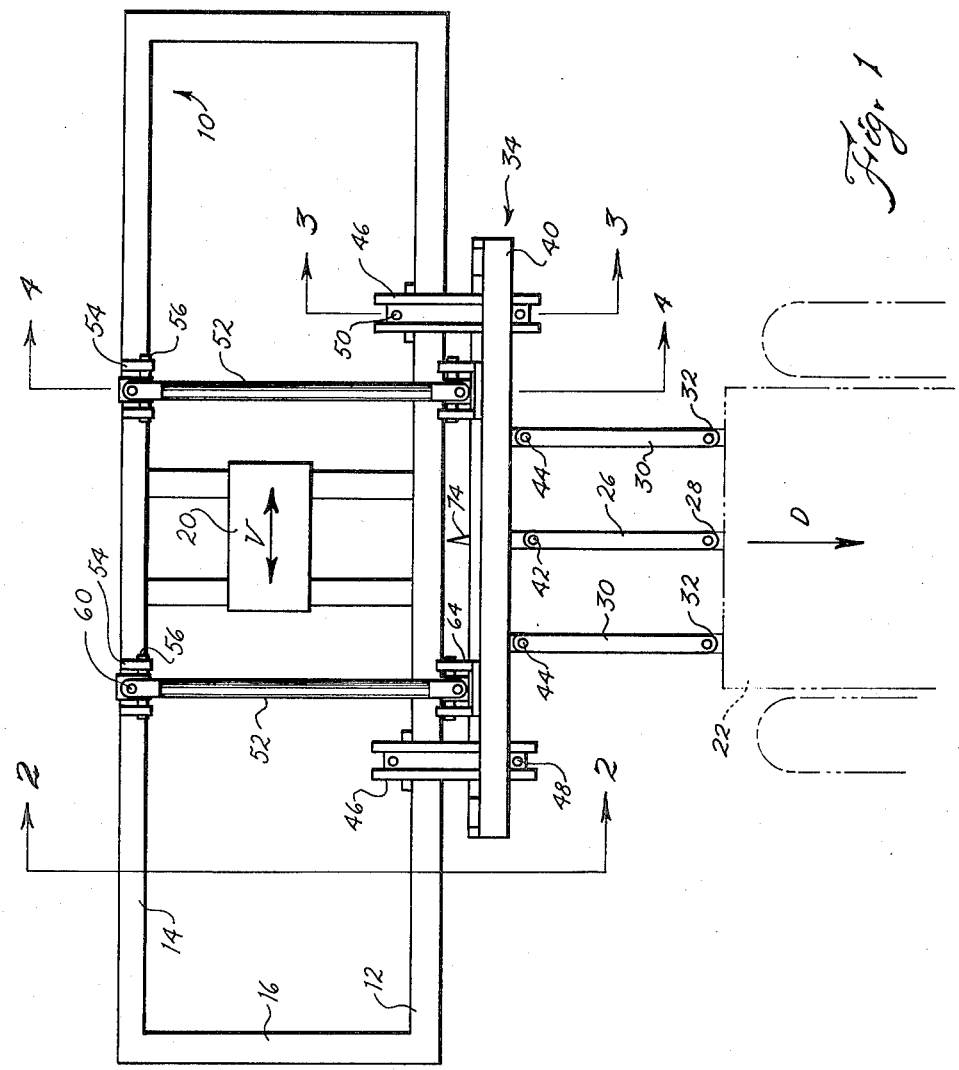
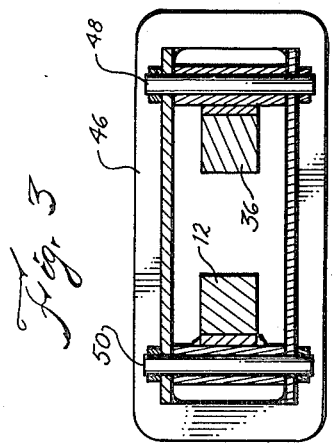

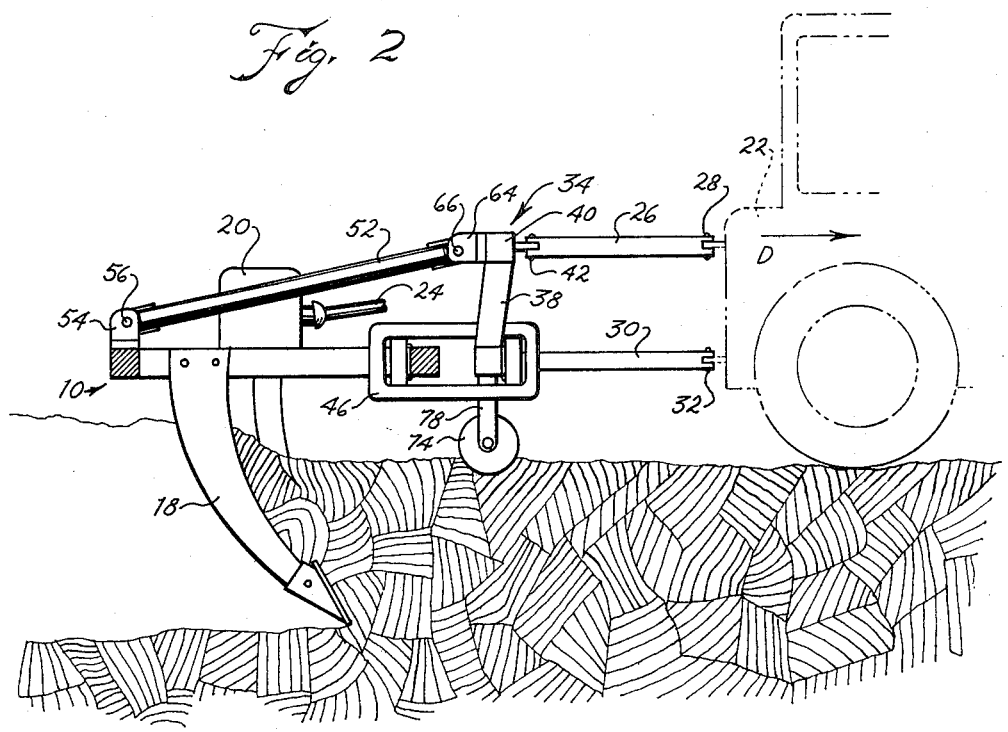
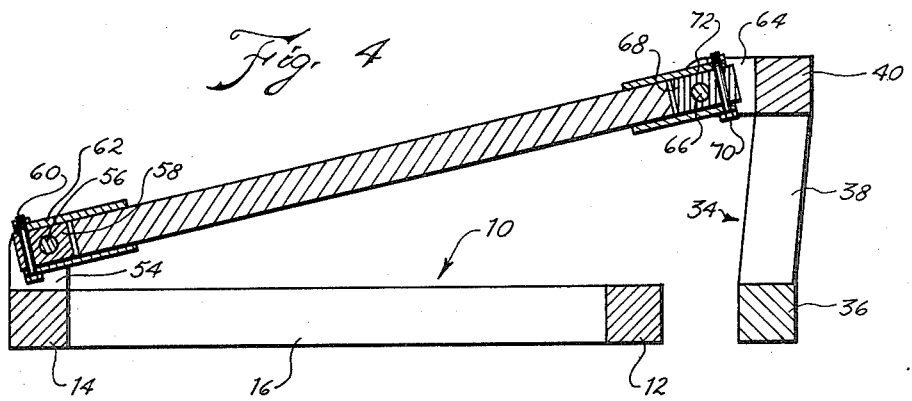

ISOLATION FRAME

BACKGROUND OF THE INVENTION (1) Field of the Invetion

This invention relates to ripper plows and more particularly to a vibrating gang of ripper plows.

(2) Description of the Prior Art

ROGERS, U.S. Pat. No. 3,448,813, discloses a tractor mounted vibrating plow. A plurality of rippers are attached to a plow frame. The vibrator on the plow frame vibrates the frame horizontally in a direction normal to the direction of draft. The frame is attached to the tractor by a three-point hitch which permits the frame to have a lateral movement normal to the direction of draft.

ROGERS, U.S. Pat. No. 3,396,804, discloses a vibrating plow having rippers which are attached to a beam. A vibrator is attached to the beam which produces a rectilinear vertical vibration. The vibrating plow beam is within an outside frame and is connected at the forward point by draft links to the outside frame. The outside frame is attached by a single point to the draft vehicle. A colter on the front of the frame carrying the vibrating plow beam is provided to reduce the amount of vibration entering the outer frame.

ROGERS, U.S. Pat. No 3,838,740, discloses a single ripper plow, such as used to bury cables. A vibrator is attached thereto to vibrate it in a horizontal direction normal to the direction of draft. The ripper plow is attached to a single pivot on a frame which is attached by draft link 12 to the towing vehicle. A compression element extends from the towing vehicle to the frame carrying the vibrating ripper plow.

At the time of filing this application, applicant was aware of the following U.S. Pat. Nos.:

Johnson, 3,502,152; Evans, 3,561,539; Rogers, 3,627,056.

SUMMARY OF THE INVENTION (1) New and Different Function

As the analysis of the prior art above shows the vibration of the plows is possible. The problem is to prevent the vibration imparted to the plows from tearing up the tractor. Therefore, it is necessary to isolate the vibration of the plows from the towing vehicle.

My solution to the problem is to place a vertical isolation frame between the vibrating plow frame and the tractor. This isolation frame is mounted to the plow frames so that there can be relative, horizontal movement between them. Also, the isolation frame is mounted to the tractor so there can be relative horizontal movement between them also. In to this, the tractor may apply vertical force to the plow frame through the isolation frame so the plows may be forced into the ground or lifted for transportation.

There will be some vibration transmitted to the isolation frame, but it will be greatly reduced from the vibration of the plow frame and, therefore, the vibration transmitted from the isolation frame to the tractor will be fractional.

To further reduce vibration in the isolation frame colters are provided.

(2) Objects of the Invention

An object of this invention is to work the earth by cultivating agricultural lands or by tearing up construction sites or the like.

Another object is to isolate the vibrations of a plow frame from the draft vehicle.

Further objects are to achieve the above with a device that is sturdy, compact, durable, lightweight, simple, safe, efficient, and reliable, yet inexpensive and easy to manufacture, install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a top plan view, schematic in representation, of a device according to this invention.

FIG. 2 is a side sectional view thereof taken substantially on line 2—2 of FIG. 1.

FIG. 3 is a sectional detail of the draft links taken substantially on line 3—3 of FIG. 1.

FIG. 4 is a sectional view of one of the struts taken substantially on line 4—4 of FIG. 1.

DESCRIPTION OF THE PREFERRED EMBODIMENT

Referring to the drawing, there may be seen that plow frame 10 is generally rectangular in shape. The plow frame includes front beam 12 and rear beam 14. These two beams are connected by end members 16. The plow frame 10 is planar and is in a horizontal plane. A plurality of ripper plows 18 are attached to the frame 10. As may be seen, the rippers or earth working tools or plows 18 extend a considerable distance downward from the frame 10. Referring to FIG. 2, the distance from the front of the front beam 12 to the back of the rear beam 14 can be called the width of the plow frame. As shown in FIG. 2, the ripper plows 18 extend from the bottom of the plow frame a distance equal to about three-fourths the width of the plow frame. Also, it may be seen that the plows are shown in the ground a distance equal to about one-half the width of the plow frame. It may be said that the ripper plows are adapted to extend deep within the earth. Detailed construction of the attachment of the plows to the frame is not shown, but this attachment is basically similar to that shown in ROGERS, U.S. Pat. No. 3,448,813, and well within the skill of the art.

Vibrator 20 is attached to the center of the plow frame 10 near the rear thereof. The vibrator is such that it produces primarily a side-to-side horizontal rectilinear vibration as shown by double headed arrow "V" in FIG. 1. Details of the vibrator have not been shown inasmuch as they are well known and are substantially similar to that shown in ROGERS, U.S. Pat. No. 3,448,813.

Tractor 22 has only been partially shown in the drawing and it is a draft means or a means for pulling the rippers 18 on the plow frame 10 forward. Also, it furnishes power through a tumble shaft or drive shaft 24 to the vibrator 20. The tractor pulls the plow frame 10 through a three-point hitch on the tractor as is customary in agricultural tractors. Specifically, the three-point hitch has upper link 26 which extends rearwardly from an upper point 28 on the tractor. Also, there are two lower links 30 which extend rearwardly from lower points 32 on the tractor. The lower links 30 are connected to lift mechanisms (not illustrated for clarity) so they may be rotated upward to raise the rippers 18 on the frame 10 from the ground or downward into the earth; this is all well known and conventional in the art. Thus, the three-point hitch serves not only to transmit the draft from the tractor 22 to the plow frame 10, but also serves to raise and lower the plow frame.

Intermediate or isolation frame 34 is provided to isolate the vibrations produced by the vibrator 20 from the tractor 22. The isolation frame has lower horizontal beam 36 connected by suitable stanchions 38 to upper horizontal beam 40. On the front of the upper beam 40 there is connection 42 by which the upper link 26 is attached to the isolation frame. On the forward portion of the lower beam 36 are two connections 44 by which the two lower links 30 are connected to the isolation frame 34.

Two draft loops or links 46 encircle the lower isolation beam 36 and the frame front beam 12. Each loop has vertical front pivot pin 48 interconnecting the the draft loop 46 and the lower beam 36. The front pivot pin 48 is in front of the lower beam 36. Rear pivot pin 50 interconnects each loop 46 and the front beam 12. Each pin 50 extends behind the front beam 12 which is the forward most member of the plow frame 10. Analysis will show that the main draft is transmitted from the tractor 22 to the plows 18 through the lower links 30 and the draft loops 46. However, analysis will show that the frame 10 is free to swing from side to side with respect to the isolation frame 34 and the isolation frame 34 itself is free to swing side to side with relationship to the tractor 22.

Brace struts 52 extend from the upper beam 40 of isolation frame 34 to the rear beam 14 of the frame 10. Analysis will show that brace struts 52 are basically in compression.

The rear end of strut 52 is connected to the rear beam 14 by rear ears 54 attached to the top of the rear beam 14. The rear ears 54 have horizontal pivot bolts 56 which extend through the ears 54 and through pivot block 58. The pivot block 58 is attached to the strut by vertical pivot bolt 60 which extends through bifurcation 62 of the strut 52 and the pivot block 58. As may be seen, the vertical pivot bolt 60 is behind the horizontal pivot bolt 58. As stated before, since the strut is in compression, the pivot block 58 is in tension and there is a reduced tendency for the pivot block 58 to buckle and bind.

The front of each strut 52 is attached to the rear of the upper beam 40 of the isolation frame 34 in a similar manner. I.e., front ears 64 on the rear of the upper beam 40 have horizontal bolts 66 which extend through the ears 64 and pivot block 68. The pivot block is connected to the strut by vertical bolt 70 which extends through forward bifurcation 72 and the pivot block 68.

The isolation frame 34 is planar and is in a vertical frame normal to the direction of draft.

Although they have not been shown in the drawing, wheels with pneumatic tires may be attached to each end of the frame 10 to aid in the vibration and the depth control of the earth working tools as is common on this type implement.

To reduce the vibration of the isolation frame 34, one or more colters 74 are attached thereto. These colters are conveniently attached by clamp 76 to the lower bean 36 of the isolation frame. Arm 78 interconnects the colters and clamps. The attachment of colters to a beam is well within the skill of the art.

The drawings are meant to illustrate the invention rather than details of construction. For example, the beams 12, 14, 36, and 40, and the struts 52, would normally be hollow rather than solid. The earth working tools 18 have not been illustrated in FIG. 1 in order not to clutter that figure. The struts 52 are preferred to be directly over the links 48 but have been illustrated otherwise to avoid confusion in FIG. 1.

As an aid to correlating the terms of the claims to the exemplary drawing, the following catalog of elements is provided:

| 10 | frame | 48 | front pivot pin |
| 12 | beam, front | 50 | rear pivot pin |
| 14 | beam, rear | 52 | struts, brace |
| 16 | member end | 54 | ear, rear |
| 18 | earth working tools | 56 | bolt, horizontal |
| 20 | vibrator | 58 | block, pivot |
| 22 | tractor | 60 | bolt, vertical |
| 24 | drive shaft | 62 | bifurcation |
| 26 | link, upper | 64 | ear, front |
| 28 | point, upper | 66 | bolt, horizontal |
| 30 | links, lower | 68 | block, pivot |
| 32 | points, lower | 70 | bolt, vertical |
| 34 | isolation frame | 72 | bifurcation, foward |
| 36 | beam, lower | 74 | colters |
| 38 | stanchions | 76 | clamp |
| 40 | beam, upper | 78 | arm |
| 42 | connection, upper | V | arrow (vibration) |
| 44 | connection, lower | D | arrow (draft) |
| 46 | loops, draft | | |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a vibrating earth working device to be drafted behind a vehicle having
   a. a plow frame having
      (i) a forward most member and
      (ii) a rear beam,
   b. a plurality of ripper plows on said plow frame,
   c. said plows adapted to be moved in a direction of draft, and
   d. a vibrator on the plow frame,
   e. said vibrator being means for vibrating the plow frame in a horizontal direction normal to the direction of draft;
   f. the improved structure comprising:
   g. a planar isolation frame located in a vertical plane which is normal to the direction of draft,
   h. two draft links interconnecting the plow frame to the isolation frame,
   j. said draft links pivoted about vertical pivots to the isolation frame forward thereof, and
   k. said draft links pivoted about vertical pivots to the plow frame behind the forward most member thereof,
   m. at least one strut extending from the top of the isolation frame to the back of the plow frame,
   n. means attached to the strut for pivoting said strut to the plow frame and to the isolation frame,
   o. three links extending from the isolation frame forward toward the vehicle.

2. The invention as defined in claim 1 with an additional limitation of
  p. said draft links are in the form of loops which encircle portions of the isolation and plow frames.

3. The invention as defined in claim 1 with an additional limitation of
  p. said strut being a compression member having
    (i) a first pivot block at the rear beam,
    (ii) a first horizontal pivot pin connecting the first pivot block to the rear beam,
    (iii) a first vertical pivot pin behind the first horizontal pivot pin connecting the first pivot block to the strut,
    (iv) a second pivot block at the isolation frame,
    (v) a second horizontal pivot pin connecting the second pivot block to the isolation frame, and
    (vi) a second vertical pivot pin forward of the second horizontal pivot pin connecting the second pivot block to the strut.

4. The invention as defined in claim 3 with an additional limitation of
  q. said draft links are in the form of loops which encircle portions of the isolation and plow frames.

* * * * *